US008618759B2

(12) United States Patent
Kock et al.

(10) Patent No.: US 8,618,759 B2
(45) Date of Patent: Dec. 31, 2013

(54) METHOD AND SYSTEM FOR HEATING OF ROBOTS IN COLD ENVIRONMENTS

(75) Inventors: Sönke Kock, Schriesheim (DE); Jens Hofschulte, Lehrte (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 13/563,213

(22) Filed: Jul. 31, 2012

(65) Prior Publication Data

US 2012/0293102 A1 Nov. 22, 2012

Related U.S. Application Data

(63) Continuation of application No. PCT/EP2010/000721, filed on Feb. 5, 2010.

(51) Int. Cl.
*G05D 23/32* (2006.01)
(52) U.S. Cl.
USPC .......................................... 318/436; 318/473
(58) Field of Classification Search
USPC .................... 318/40, 159, 436, 471–473, 372
See application file for complete search history.

(56) References Cited

U.S. PATENT DOCUMENTS

| | | | |
|---|---|---|---|
| 4,195,324 A * | 3/1980 | Waltz | 361/25 |
| 4,638,643 A * | 1/1987 | Sakazume et al. | 62/209 |
| 4,808,896 A * | 2/1989 | Katsuragi et al. | 318/436 |
| 6,617,819 B2 * | 9/2003 | Dohmae et al. | 318/599 |
| 7,102,318 B2 * | 9/2006 | Miura et al. | 318/400.4 |

FOREIGN PATENT DOCUMENTS

| | | |
|---|---|---|
| JP | 63-127885 A | 5/1988 |
| JP | 6-126672 A | 5/1994 |
| JP | 10-193293 A | 7/1998 |
| JP | 2005-262401 A | 9/2005 |
| RU | 2 189 899 C2 | 9/2002 |

OTHER PUBLICATIONS

International Search Report (PCT/ISA/210) issued on Apr. 27, 2010, by the European Patent Office as the International Searching Authority for International Application No. PCT/EP2010/000721.

* cited by examiner

*Primary Examiner* — Bentsu Ro
(74) *Attorney, Agent, or Firm* — Buchanan Ingersoll & Rooney PC

(57) ABSTRACT

A method and system are disclosed for heating of robots in cold environments, whereby the robot possesses permanent magnet brushless or three-phase synchronous motors with three motor phases including three stator coils ($L_1$, $L_2$, $L_3$) connected to an inverter controllable by a control-unit and with a rotor with permanent magnet excitation. A current can be applied to at least one phase of the stator coil ($L_1$, $L_2$, $L_3$) of the motor such that, if the motor stands still, a directed magnetic flux ($\Phi$) is created which interacts with the permanent magnets of the rotor in such a way that the resulting torque will be close to zero.

8 Claims, 3 Drawing Sheets

METHOD AND SYSTEM FOR HEATING OF ROBOTS IN COLD ENVIRONMENTS

RELATED APPLICATION(S)

This application claims priority as a continuation application under 35 U.S.C. §120 to PCT/EP2010/000721 filed as an International Application on Feb. 5, 2010 designating the U.S., the entire content of which is hereby incorporated by reference in its entirety

FIELD

The disclosure relates to a method and a system for heating of robots, for example, industrial robots, in cold environments, whereby the robot possesses permanent magnet brushless or three-phase synchronous motors with three phases including three stator coils connected to an inverter controllable by a control-unit and with a rotor with permanent magnet excitation.

BACKGROUND INFORMATION

Robots can operate in a temperature range of, for example, approximately +5° C. to 50° C. In cold environments, for example, cold storage houses or in outdoor environments, the temperature can get lower, for example −20° C. to −30° C. This can limit the use of industrial robots. The temperature range of today's standard industrial robots can be limited by the joint-bearing sealings as well as the lubrication of the gears. In order to run a robot below +5° C., the gears and surrounding components should be heated up before operation. As soon as the robot is in normal operation, dissipating energy of the drive train can be sufficient to keep critical regions of the robot heated. However, after a stand still it can be desirable to warm up the drive train by either running a warm-up movement, which can create wear in the cold components, or by adding external local heating, which adds cost to the installation. While some special low temperature sealings etc. can be used, some components of the robot will run outside normal specification.

SUMMARY

A method for heating of robots in cold environments is disclosed, comprising: providing a robot with permanent magnet brushless or three-phase synchronous motors with three motor phases including three stator coils ($L_1$, $L_2$, $L_3$) connected to an inverter controllable by a control-unit and with a rotor with permanent magnet excitation; and applying a current to at least one phase stator coil ($L_i$, $L_2$, $L_3$) of the motor when the motor stands still to create a directed magnetic flux ($\Phi$) which interacts with permanent magnets of the rotor in such a way that a resulting torque will be close to zero.

A system for heating of robots in cold environments is disclosed, comprising: permanent magnet brushless or three-phase synchronous motors with three motor phases including three stator coils ($L_1$, $L_2$, $L_3$) connected to inverters for mounting in the robot for heating up drive train components of the robot when the robot is in standstill; a control-unit for controlling the inverters; a rotor with permanent magnet excitation; and at least one supervisory-control-unit for monitoring the motor temperature to address overheating.

A robot for use in cold environments is disclosed, comprising: permanent magnet brushless or three-phase synchronous motors with three motor phases including three stator coils ($L_1$, $L_2$, $L_3$) connected to inverters for mounting in the robot for heating up drive train components of the robot when the robot is in standstill; a control-unit for controlling the inverters; a rotor with permanent magnet excitation; and at least one supervisory-control-unit for monitoring the motor temperature to address overheating.

BRIEF DESCRIPTION OF THE DRAWINGS

The disclosure will now be further explained by exemplary embodiments and with reference to the accompanying drawings, in which.

DETAILED DESCRIPTION

Exemplary embodiments of the disclosure provide a method and a system for heating of robots in cold environments.

Exemplary embodiments of the disclosure provide a method for heating robots in cold environments, whereby a robot possesses permanent magnet brushless or three-phase synchronous motors with three motor phases including three stator coils connected to an inverter controllable by a control-unit and with a rotor with permanent magnet excitation. A current is applied to at least one phase of the motor if the motor stands still creating a directed magnetic flux which interacts with the permanent magnets of the rotor in such a way that the resulting torque will be close to zero.

Exemplary embodiments of the disclosure provide a system for heating robots in cold environments whereby a robot possesses permanent magnet brushless or three-phase synchronous motors with three motor phases including three stator coils connected to inverters controllable by control-units and with a rotor with permanent magnet excitation. The inverters and motors in standstill are used to heat up the drive train components (e.g., designated key components) and at least one supervisory-control-unit monitors the motor temperature in order to address (e.g., avoid) overheating.

The current through the stator windings can heat up the stator due to electrical resistance losses, which can create a warm-up of the motor. In this way exemplary embodiments of the disclosure can heat up the drive trains. This can save time and can protect the mechanical structure of the robot from being damaged. Little to no additional equipment is needed and the procedure is simple to implement.

Figure 1:
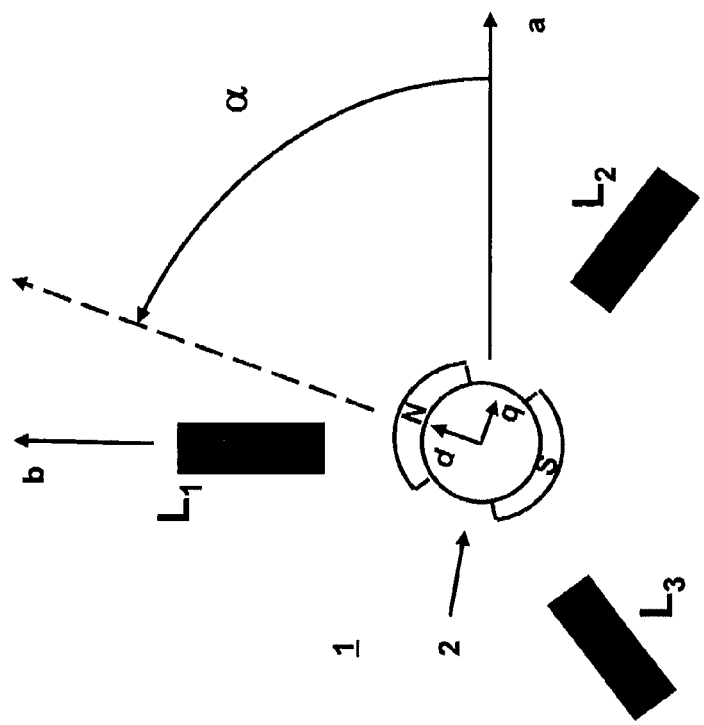
FIG. 1 shows an exemplary permanent magnet brushless or synchronous motor with rotor-coordinates and rotor position in stator-coordinates.

FIG. 1 shows an exemplary permanent magnet brushless or synchronous motor 1 with rotor-coordinates and rotor position in stator-coordinates with three motor phases including stator coils $L_1$, $L_2$, $L_3$, rectangular stator-coordinates respectively -axes a and b, rotor 2 with permanent magnet(s) with north pole N and south pole S, rectangular rotor-coordinates respectively—axes d and q, rotor position a related to stator-coordinates a, b, that means a corresponds to the angle between a-stator-axis and d-rotor-axis.

Figure 2:
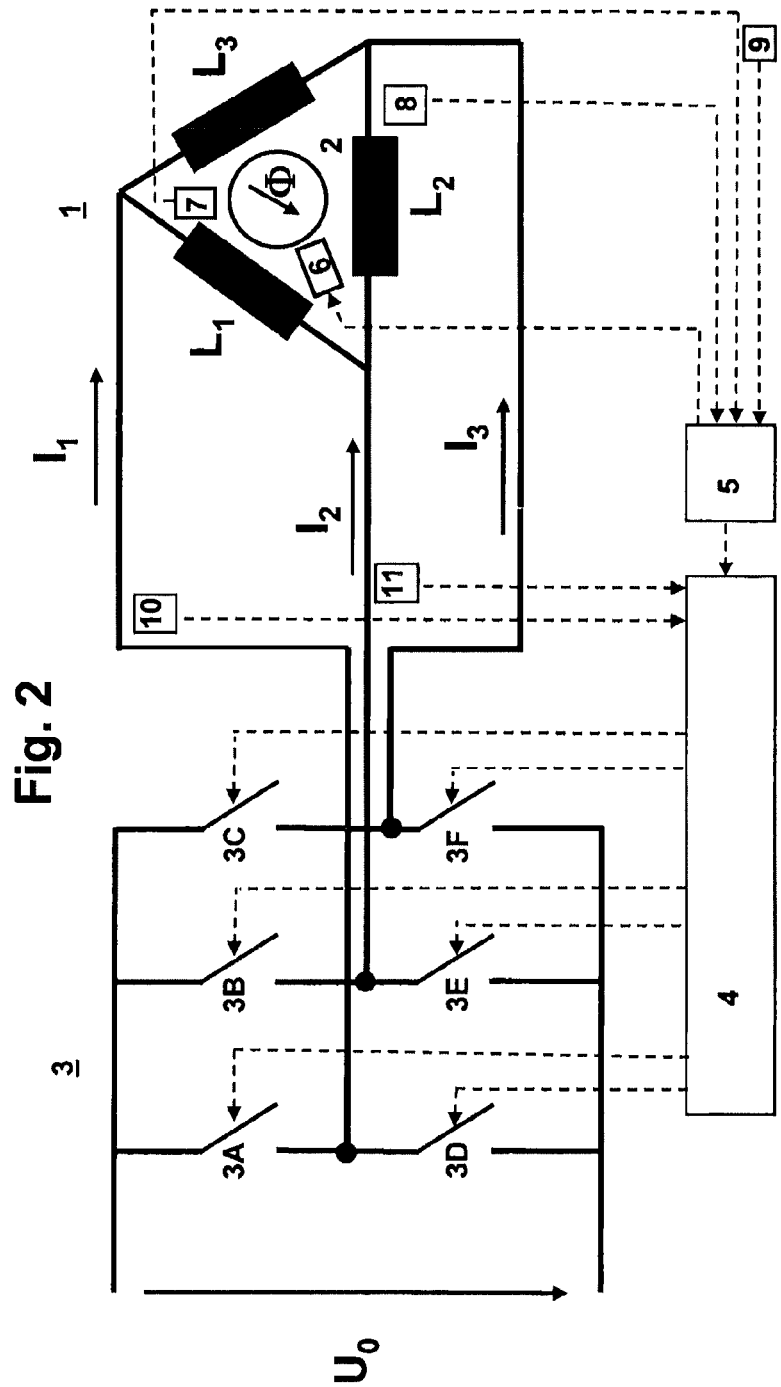
FIG. 2 shows an exemplary robot drive-system with inverter and motor.

FIG. 2 shows an exemplary robot drive-system with inverter and motor with rotating field inverter 3 with six semiconductors 3A, 3B, 3C, 3D, 3E, 3F arranged in three-phase bridge connection with input DC-voltage $U_0$ and output motor phase currents respectively $I_1$, $I_2$, $I_3$, control-unit 4 to control the semiconductors 3A, 3B, 3C, 3D, 3E, 3F of the inverter 3, receiving signals from motor phase current sensors 10, 11, permanent magnet brushless or synchronous motor 1 with stator coils $L_1$, $L_2$, $L_3$, rotor 2 with permanent magnet(s), rotor-position-sensor 7, brakes 6 for the rotor 2, flux $\Phi$ generated by stator coils $L_1$, $L_2$, $L_3$, motor-temperature-sensor 8, ambient-temperature-sensor 9, current sensors 10 and 11, supervisory-control-unit 5 to control the brakes 6 and the control-unit 4 and to receive signals from the rotor-position-sensor 7, from the motor-temperature-sensor 8 and from the ambient-temperature-sensor 9.

Exemplary embodiments of the disclosure can use the robot drive-system as a power supply, to warm up the permanent magnet brushless or synchronous motor(s) 1 without warming-up movement cycles before starting operation, by applying a stator current in d-direction of the rotors see d-coordinate in FIG. 1, which does not create any motion but generates heat due to resistance losses. As the motors 1 are directly connected to the gears, this generated heat can be transferred into the gears with its lubrication and sealings by thermal convection. This way, no additional heating equipment will be needed, and moving the cold drive trains of the robot can be avoided.

The existing robot drive-system with its inverters 3 can pulse DC-currents to the motor 1 by switching the phase voltages in the order of a several kHz. See FIG. 2. Currents are filtered because of the stator inductances respectively stator coils $L_1$, $L_2$, $L_3$. This feature can help to create a quasi sinusoidal 3-phase current which generates a rotating field driving the motor 1 but it can also be used to create static "quasi-DC"-currents if the motor 1 stands still. In order to control the currents that are caused by pulsed DC-voltages of the inverter, it is common to use current sensors 10, 11 in two phases of the motor and a current regulator that controls the switching pattern of the inverter so that the desired average current can be achieved. A third motor phase current sensor is not required as the three currents add up to zero.

Figure 3:
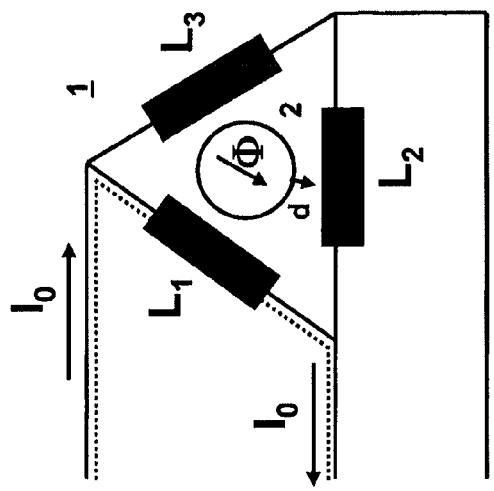
FIG. 3 shows a first exemplary embodiment according to the disclosure with a DC-current through one stator coil.

FIG. 3 shows a first exemplary embodiment of the disclosure with a DC-current through one stator coil. In this embodiment, a pulsed DC-current $I_0$ is applied (with the help of inverter 3 and control-unit 4) to one phase of the motor—in the shown case the DC-current $I_0$ flows through stator coil $L_1$. The current magnitude is controlled by the switching pattern, e.g. a pulse-width-modulation (with the help of the semiconductors 3A, 3B, 3C, 3D, 3E, 3F). The DC-current $I_0$ creates a directed magnetic flux (I), which interacts with the permanent magnets of the rotor 2. Depending on the initial rotor position a when the current is applied (see FIG. 1), a torque will be generated that lets the motor act against the brake 6, which is an unwanted operating method. Without a brake 6, the motor would "flip" into the commutation position, i.e. in direction of the stator flux. When the rotor is aligned, movement stops and the speed reduced to zero. To avoid this unwanted torque, the following procedure can be applied. Step 1, inverter 3 is turned on, brakes 6 are released. Step 2, the motor 1, respectively rotor 2 is moved a few degrees into a commutation position. Step 3, brakes 6 are applied again and Step 4, if DC-current $I_0$ is now applied, the resulting torque will be close to zero which is a preferred operating mode.

Due to the gearbox transmission, the actual movement of the robot arm during this procedure will be very small. To avoid collisions, the robot should nevertheless be in a safe position where small movements can be tolerated. The drawback of this method is that it cannot be applied on axes that are subject to gravity load, as the opening of the brake may cause the robot arm to fall which causes a safety hazard.

Figure 4:
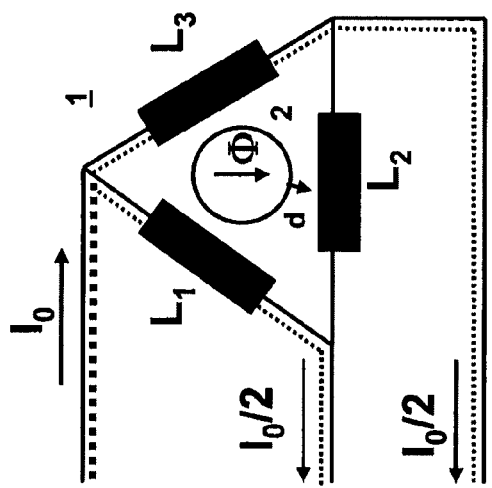
FIG. 4 shows a second exemplary embodiment according to the disclosure with DC-currents through two stator coils.

FIG. 4 shows a second exemplary embodiment of the disclosure with DC-currents through two stator coils, which means a DC-current is applied to two phases of the motor and the DC-current $I_0$ distributes into a first DC-current $I_0/2$ flowing through stator coil $L_1$ and a second DC-current $I_0/2$ flowing through stator coil $L_3$. This method has similar advantages and disadvantages as the previous method, but can show a better heat distribution within the stator, as all coils are heated up.

Figure 5:
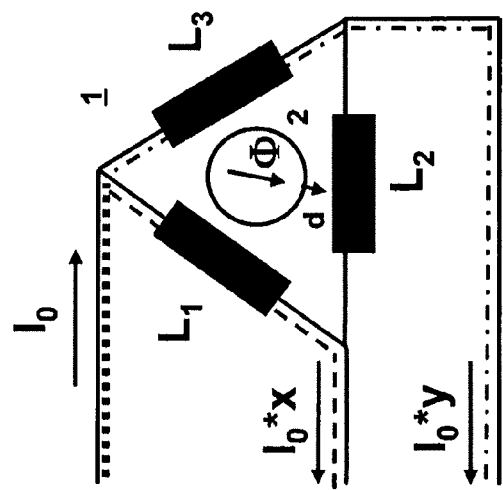
FIG. 5 shows a third exemplary embodiment according to the disclosure with directed magnetic flux aligned with d-rotor-axis and directed DC-currents through two stator coils.

FIG. 5 shows a third exemplary embodiment of the disclosure with directed magnetic flux aligned with d-rotor-axis and directed DC-currents through two stator coils. In this embodiment, by knowing the fixed rotor position which is measured by the rotor-position-sensor 7—, it is also possible to create a first DC-stator-current $I_0*x$ (directed according a-stator-axis) flowing through stator coil $L_1$ and a second DC-stator-current $I_0*y$ (directed according b-stator-axis) flowing through stator coil $L_3$ that generate a directed magnetic flux $\Phi$ which is exactly aligned with the rotor flux, if x and y are chosen appropriately. This is equivalent of saying that a d-current (current directed according d-rotor-axis) is induced in the motor 1 while standing still, which creates a flux $\Phi$ superimposed to the rotor flux. Care should be taken to apply the flux (13. in the direction of the rotor flux, because in the case of opposition directions a demagnetisation of the rotor 2 with permanent magnet may occur.

An advantage of the disclosure is that it does not require pre-alignment of the rotor prior to applying the currents directed DC-stator-current $I_0*x$ and directed DC-stator-current $I_0*y$ and that will not cause an alignment movement of the rotor, as the fluxes are already aligned when the currents are applied.

The described methods can be applied to one motor or several motors of the robot at the same time. Different currents can be selected for each motor, as each motor has its own drive (including inverter). It is also possible to vary the currents over time, e.g. to start with a high current when the motor is supposed to heat up, and to reduce the current when the motor is hot and convection takes place into the gearbox. This can be done with the help of the supervisory-control-unit 5.

It might further be considered to additionally cover the motors by appropriate insulation to direct the thermal convection into the gearing and preventing heating up the environment.

The temperature of the motor 1 can be monitored to avoid overheating and damage. This can either be done by motor-temperature-sensors 8 that send the temperature back to the drive-system or by a mathematical observer model that estimates the motor temperature based on voltage and current measurements and a thermal motor model. Measurement of the ambient temperature with the help of an ambient-temperature-sensor 9 can be useful to adapt the injected energy to the requirements, and to get the starting point for the temperature estimate. Other possible procedures are to periodically measure the stator resistance and to translate this into a temperature by look-up tables or mathematical resistance/temperature relations.

The above methods may be useful in the following robot applications, freeze room handling of goods and outdoor operations in cold environments, like offshore, arctic or general winter conditions where the robot performs inspection, maintenance or other operations.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 1 permanent magnet brushless or synchronous motor
2 rotor with permanent magnet
3 inverter of the robot drive-system with six semiconductors
   3A, 3B, 3C, 3D, 3E, 3F
4 control-unit
5 supervisory-control-unit
6 brakes
7 rotor-position-sensor
8 motor-temperature-sensor
9 ambient-temperature-sensor
10 motor phase current sensor
11 motor phase current sensor
d rotor-coordinate, rotor-axis
$I_1, I_2, I_3$ stator-respectively phase-currents
$I_0$ DC-current
$I_0^*x$ directed DC-stator-current
$I_0^*y$ directed DC-stator-current
$L_1, L_2, L_3$ stator coils
N north pole of permanent magnet of the rotor
q rotor-coordinate, rotor-axis
S south pole of the permanent magnet of the rotor
$U_0$ input DC-voltage
a stator-coordinate, stator-axis
b stator-coordinate, stator-axis
$\alpha$ rotor position related to stator-coordinates
$\Phi$ directed magnetic flux (created by stator coils)

What is claimed is:

1. A method for heating of robots in cold environments, comprising:
   providing a robot with permanent magnet brushless or three-phase synchronous motors with three motor phases including three stator coils ($L_1, L_2, L_3$) connected to an inverter controllable by a control-unit and with a rotor with permanent magnet excitation;
   applying a current to at least one phase stator coil ($L_1, L_2, L_3$) of the motor when the motor stands still to create a directed magnetic flux ($\Phi$) which interacts with permanent magnets of the rotor in such a way that a resulting torque will be close to zero wherein the current is a DC-current or a pulsed DC-current ($I_0$) controlled by a current regulator;
   measuring the rotor position by a rotor-position-sensor; and
   creating a first static directed DC-stator-current ($I_0^*x$) flowing through stator coil $L_1$ and a second static directed DC-stator-current ($I_0^*y$) flowing through strator coil $L_3$, that generate a directed magnetic flux ($\Phi$) which is aligned with the rotor flux.

2. The method according to claim 1, comprising:
   applying the DC-current in a designated axis of the rotor.
3. The method according to claim 1, comprising:
   varying the current over time and starting with a high current when the motor is to be heated up, and ending with reduced or zero current when the motor is hotter.
4. The method according to claim 1, comprising:
   monitoring a motor-temperature of the motor with a sensor to avoid overheating.
5. The method according to claim 1, comprising:
   monitoring temperature of the motor with a mathematical observer model that estimates the motor temperature based on voltage and current measurements.
6. The method according to claim 1, comprising:
   measuring ambient temperature with an ambient-temperature-sensor; and
   adapting injected energy to heating specifications of the robot.
7. A system for heating of robots in cold environments, comprising:
   permanent magnet brushless or three-phase synchronous motors with three motor phases including three stator coils ($L_1, L_2, L_3$) connected to inverters for mounting in the robot for heating up drive train components of the robot when the robot is in standstill;
   a control-unit for controlling the inverters;
   a rotor with permanent magnet excitation;
   at least one supervisory-control-unit for monitoring the motor temperature to address overheating;
   a current regulator for controlling a current applied to the three stator coils ($L_1, L_2, L_3$), wherein the current is a DC-current or a pulsed DC-current ($I_0$); and
   a rotor-position-sensor for determining a fixed rotor position, wherein the control unit is arranged to control the inverters based on the measured rotor position to create a first static directed DC-stator current ($I_0^*x$) flowing through stator coil $L_1$ and a second static directed DC-stator-current ($I_0^*y$) through stator coil $L_3$, that generate a directed magnetic flux ($\Phi$) which is aligned with the rotor flux.
8. A robot for use in cold environments, comprising:
   permanent magnet brushless or three-phase synchronous motors with three motor phases including three stator coils ($L_1, L_2, L_3$) connected to inverters for mounting in the robot for heating up drive train components of the robot when the robot is in standstill;
   a control-unit for controlling the invertors;
   a rotor with permanent magnet excitation;
   at least one supervisory-control-unit for monitoring the motor temperature to address overheating;
   a current regulator for controlling a current applied to the three stator coils ($L_1, L_2, L_3$), wherein the current is a DC-current or a pulsed DC-current ($I_0$); and
   a rotor-position-sensor for determining a fixed rotor position, wherein the control unit is arranged to control the inverters based on the measured rotor position to create a first static directed DC-stator current ($I_0^*x$) flowing through stator coil $L_1$ and a second static directed DC-stator-current ($I_0^*y$) flowing through stator coil $L_3$, that generate a directed magnetic flux ($\Phi$) which is aligned with the rotor flux.

* * * * *